June 26, 1945.　　E. M. ARENTZEN　　2,378,892
TRUCK OR VEHICLE
Filed March 25, 1942　　3 Sheets-Sheet 2
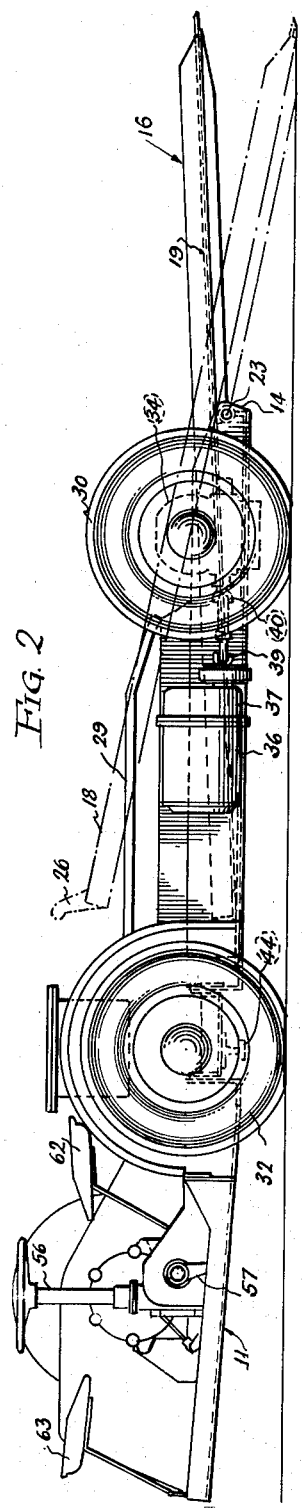
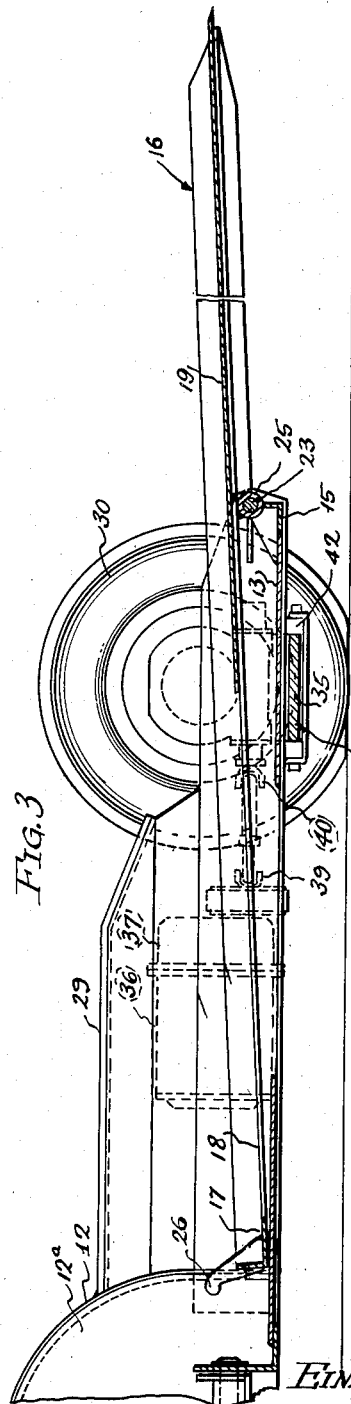
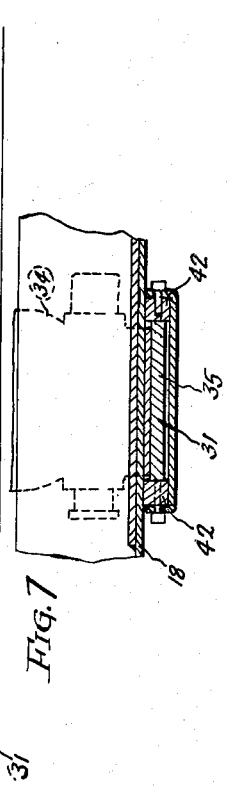
INVENTOR.
EINAR M. ARENTZEN
BY
Clarence F. Poole
ATTORNEY June 26, 1945.  E. M. ARENTZEN  2,378,892
TRUCK OR VEHICLE
Filed March 25, 1942  3 Sheets-Sheet 3

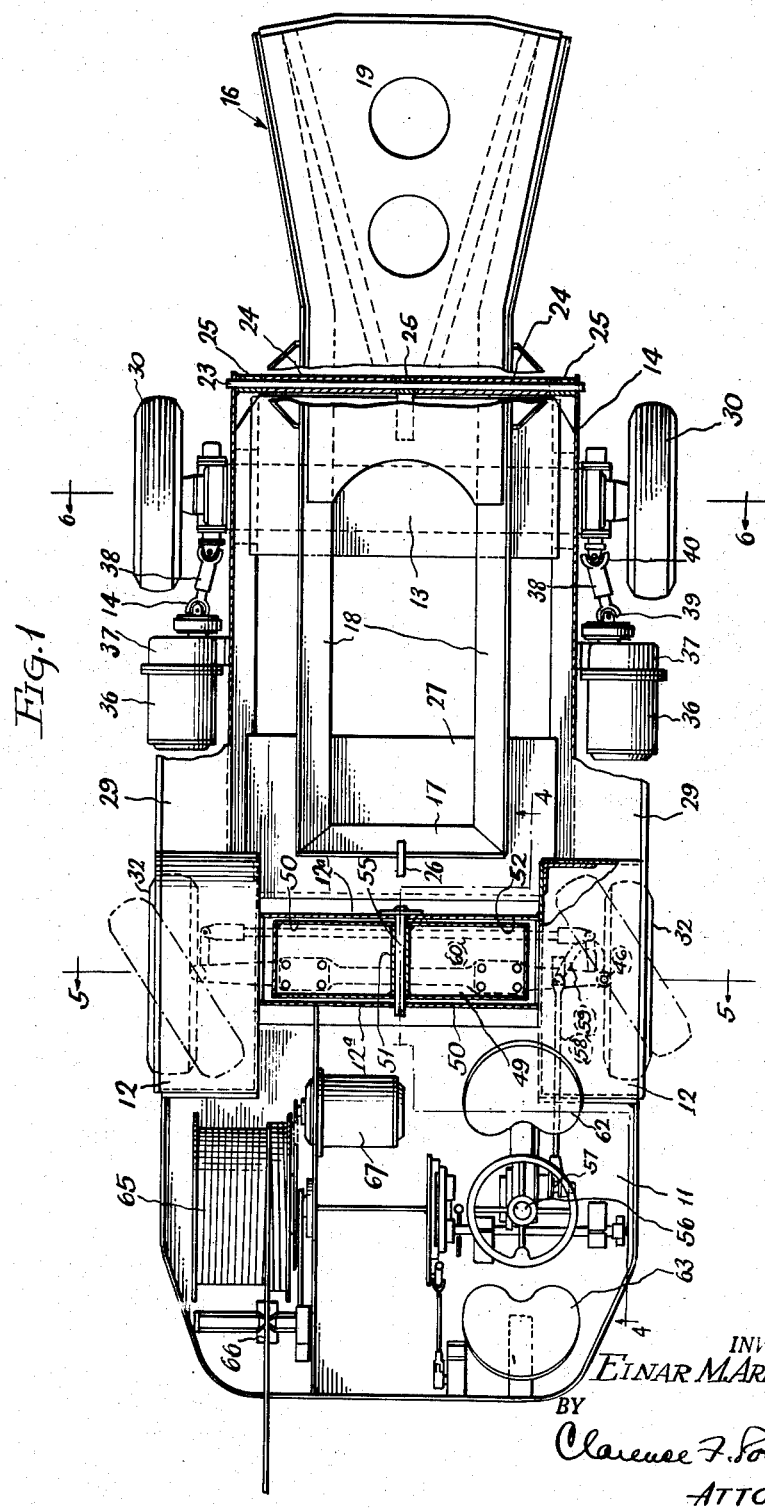

INVENTOR.
EINAR M. ARENTZEN.
BY
Clarence F. Poole
ATTORNEY

Patented June 26, 1945

2,378,892

UNITED STATES PATENT OFFICE 2,378,892

TRUCK OR VEHICLE

Einar M. Arentzen, Charleroi, Pa., assignor to Goodman Manufacturing Company, Chicago, Ill., a corporation of Illinois Application March 25, 1942, Serial No. 436,079

5 Claims. (Cl. 180—54)

This invention relates to improvements in trucks or vehicles of the kind used for transporting mining machines, especially kerf-cutting machines, in mines, and more particularly to trucks having rubber-tired wheels arranged for steering and self-propulsion over the mine floor independently of mine tracks.

Among the objects of the invention is to provide an improved truck structure for the purpose above described, wherein the steering, driving and equalizing devices are especially arranged to produce a compact body having a minimum height, width and length commensurate with its intended purposes, and with its carrying platform arranged at a relatively low level so that the truck will more readily accommodate itself and its load to the limited working spaces available in mines.

A further object is to provide an improved arrangement whereby the steering wheels are located at the end of the truck opposite the carrying platform, so as to increase the ease of steering of a truck of this character. Other objects of the invention will appear from time to time as the following description proceeds.

The invention may best be understood by reference to the accompanying drawings, in which:

Figure 1 is a top plan view of a truck constructed in accordance with my invention, with parts broken away to show certain details;

Figure 2 is a side view of the truck shown in Figure 1;

Figure 3 is an enlarged longitudinal section of the front end of the truck;

Figure 7 is an enlarged detail section taken on line 7—7 of Figure 6.

Figure 4:
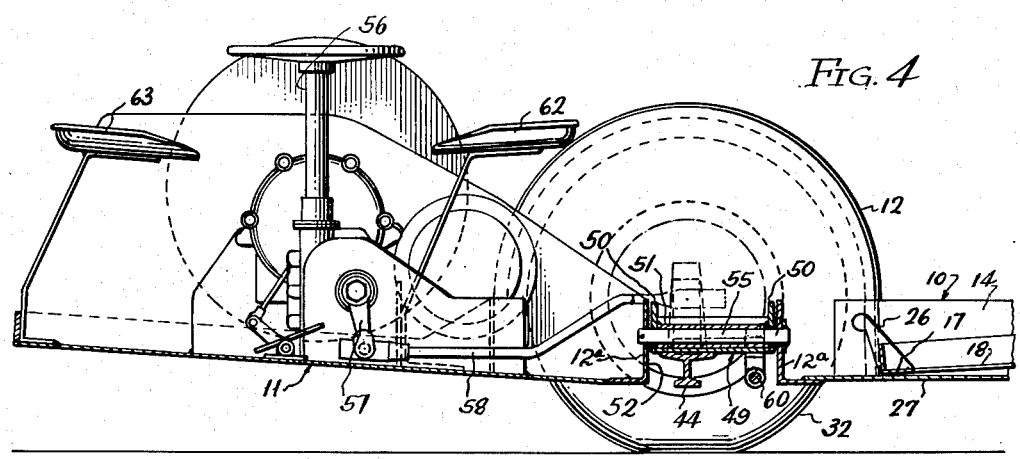
Figure 4 is a section of the rear end of the truck, taken generally on line 4—4 of Figure 1.

Referring now to details of the embodiment of the invention shown in the drawings, the truck frame indicated generally at 10 comprises a rear platform 11 at one end, a pair of arched wheel wells 12, 12 at opposite sides, cross connected by a pair of upright frame members 12a, 12a, and a front platform 13 consisting of a pair of spaced side sills 14, 14 extending forwardly from said wheel wells, and joined by a front end sill 15. The side sills 14 preferably consist of angle bars, as shown.

A tilting frame 16 for supporting a mining machine is mounted on the front platform for forward tilting movement to assist in loading and unloading said mining machine. Said tilting frame includes a rear frame member 17, spaced side frame members 18, 18, flared outwardly at their front ends, and a bottom plate 19 joining the front ends of said side frame members and extending rearwardly beyond the flared portion of said tilting frame. The rear and side frame members 17 and 18 are preferably formed of angle bars, with their upright flanges 20 and 21, respectively, forming guides for receiving the mining machine, and the horizontal flanges 22 of said side members providing support for the side edges of the bottom plate 19.

The tilting frame 16 is hinged to the end sill 15 of the front platform 13 by a pivot rod 23 passing through brackets 24, 24 fixed beneath said tilting frame, and eyes 25, 25 mounted on said front end sill. The rear end of the tilting frame is adapted to rest on a cross plate 27 connecting the side frame members 14, 14 at the rear end of the front platform 13. Outwardly flared side boards 29, 29 are connected along the side frame members 14, 14 forwardly of the wheel wells 12, 12. An upstanding hook 26 is fixed on the rear frame member 17 of the tilting frame, to serve as an anchor for the feed rope of a mining machine when the latter is dragged upon said tilting frame.

The running gear includes rubber tired front wheels 30, 30 mounted on a drop axle structure indicated generally at 31, and rubber tired rear wheels 32, 32 mounted on a drop axle equalizing structure indicated generally at 33, which provides a three-point suspension for the truck frame on said axles.

Figure 6:
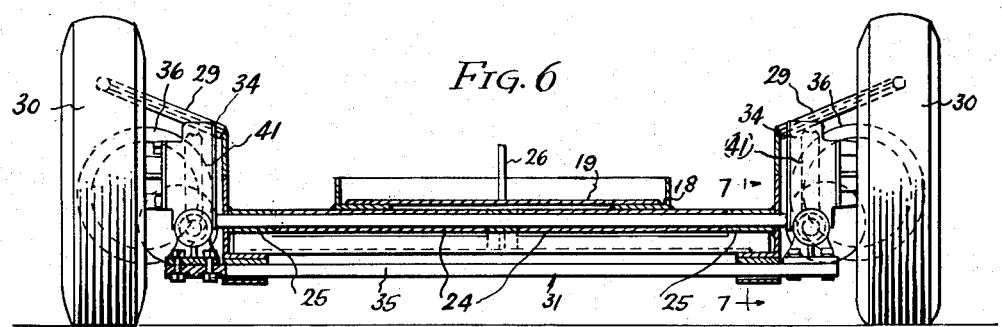
Figure 6 is a transverse section taken on line 6—6 of Figure 1.

The front wheels 30, 30 serve as the driving wheels, and have suitable bearing on upstanding drive housings 34, 34 rigidly mounted at opposite ends of a relatively flat axle member 35 extending beneath the main frame 10, as shown in Figure 6. Each of the wheels 30, 30 is independently driven by a motor 36 suitably supported along the outer side of the main frame to the rear of its respective wheel, and operatively connected thereto through a gear reduction indicated generally at 37, a coupling shaft 38 with universal joints 39, 40, therein, and a suitable worm drive 41 disposed in the drive housing 34. The motors 36, 36 are disposed substantially within the lateral limits of their respective wheels and the truck body. The drive motors and worm gear drive may be similar to that heretofore employed in certain types of mine vehicles, so need not be described in greater detail as they form no part of the present invention.

The flat axle member 35 passes through a pair of brackets 42, 42 secured beneath the side frame members 18, 18, said brackets preferably affording limited vertical clearance for said axle, as shown in Figure 6, so as to permit longitudinal flexing of the latter under varying loads. This flat axle structure is also similar to that heretofore employed in certain types of mine vehicles.

Figure 5:
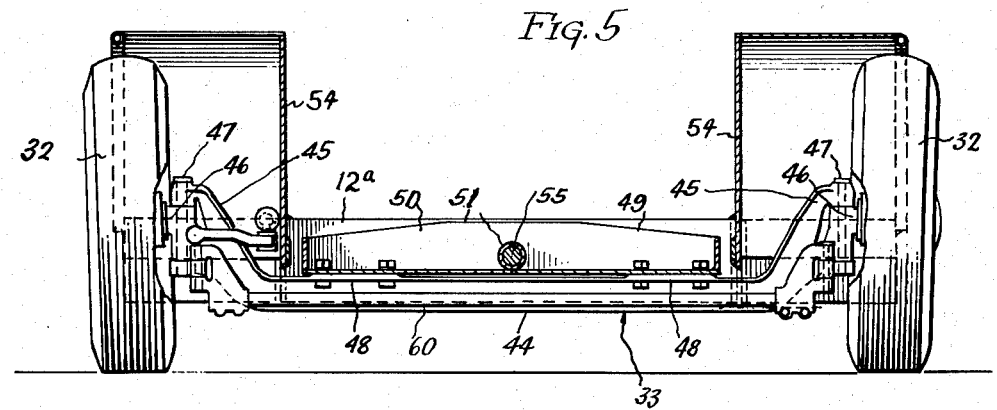
Figure 5 is a transverse section taken on line 5—5 of Figure 1, but with the controller casing removed.

The equalizing or three-point suspension structure for the rear wheels 32, 32 includes a drop axle 44 which may be of the conventional I-beam type used in automotive vehicles and provided with the usual form of steering brackets 45, 45 at opposite ends, to which steering knuckles 46, 46 are swivelled on pins 47, 47. Said axle also has saddles 48, 48 which are bolted to the under face of a box-shaped rocking member 49. The latter member has upright side walls 50, 50, having a bearing sleeve 51 secured therebetween on the longitudinal center line of the truck, as shown in Figures 4 and 5. The equalizing member 49 fits in an elongated opening 52 in the truck body, defined by the transverse upright frame members 12a, 12a which connect the inner walls 54, 54 of the wheel wells 12, 12, as previously described, to form an open box frame. A pivot pin 55 is supported at opposite ends in the frame members 12a, 12a and passes through the bearing sleeve 51 and the walls 50, 50 of the rocking member 49, so as to support the latter for limited lateral rocking movement.

The rear wheels also have steering connections, herein consisting of an upright steering post 56 mounted on the rear platform 11, operatively connected as usual with a rocking lever 57 which moves a drag link 58 connected to a steering lever 59 on the adjacent steering knuckle 46. The two steering knuckles are cross connected for simultaneously steering by a tie bar 60, which passes along the transverse opening 52 at one side of the axle 44.

The rear platform 11 also carries a pair of operator's seats 62, 63 disposed in front and rear respectively of the steering post 56 so that the operator may face in either direction, depending upon which way the truck is being driven. A cable reel 65 and a spooling device 66 are also mounted as usual on the rear platform and are driven by an electric motor 67.

The provision of driving wheels at the front end and steering wheels at the rear end of the vehicle affords especial advantages of simplicity and maneuverability over prior vehicles wherein the front wheels have been used for steering and the rear wheels for driving. It will be understood that when a mining machine is loaded on the truck, its front end, usually consisting of a cutter bar, projects several feet beyond the front end of the tilting frame, so that the portion of the entire assemblage extending beyond the front wheels is considerably longer than that portion which extends beyond the rear wheels. I find that steering is much easier and more certain in the limited spaces available in a mine, when the swivelled or steering wheels are near the operator's end of the truck assemblage than when said steering wheels are disposed near the opposite end, and particularly when they are located near the center of the assemblage rather than toward the operator's end thereof.

On the other hand, the arrangement whereby the motors 36, 36 drive the front wheels provides an especially simple and compact design wherein overall length, width, and height of the entire truck can be maintained at a minimum.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a truck for mining machines, a frame having a loading platform at one end thereof and an operator's platform at the other, an axle pivotally supported on said frame intermediate said platforms for transverse rocking movement on an axis disposed above the level of said operator's platform, and having supporting wheels swivelled thereon for steering said truck, a second drop axle in relatively fixed supporting relation beneath said loading platform and having supporting wheels thereon, and motors mounted at opposite sides of said loading platform each having independent driving connections with one of said last named wheels.

2. In a truck for mining machines, a frame having a loading platform at one end thereof and an operator's platform at the other, an axle pivotally supported on said frame intermediate said platforms for transverse rocking movement on an axis disposed above the level of said operator's platform, and having supporting wheels swivelled thereon for steering said truck, a second drop axle in relatively fixed supporting relation beneath said loading platform and having supporting wheels thereon, and motors mounted on opposite sides of said loading platform substantially within the outer limits of said last named wheels, and each having independent driving connections with one of said last named wheels.

3. In a truck for mining machines, a frame including a loading platform at one end and an operator's platform at the other, an upright transverse frame between said platforms, wheel wells disposed at opposite sides of said truck having upright inner walls rigidly connected to and forming a common supporting connection for said upright frame and said platforms, a transverse axle supported on said transverse frame and having wheels at opposite ends thereof within said wheel wells, and a drop axle mounted beneath the front platform having wheels at opposite ends thereof.

4. In a truck for mining machines, a frame having a loading platform at one end thereof and an operator's platform at the other, an axle pivotally supported on said frame intermediate said platforms for transverse rocking movement and having supporting wheels swivelled thereon for steering said truck, a second drop axle in relatively fixed supporting relation beneath said loading platform and having supporting wheels thereon, and motors mounted at opposite sides of said loading platform each having independent driving connections with one of said last named wheels.

5. In a truck for mining machines, a frame having a loading platform at one end thereof and an operator's platform at the other, an axle pivotally supported on said frame intermediate said platforms for transverse rocking movement and having supporting wheels swivelled thereon for steering said truck, a second drop axle in relatively fixed supporting relation beneath said loading platform and having supporting wheels thereon, and motors mounted on opposite sides of said loading platform substantially within the outer limits of said wheels, and each having independent driving connections with one of said last named wheels.

EINAR M. ARENTZEN.